United States Patent
Katsuta et al.

(10) Patent No.: US 9,115,751 B2
(45) Date of Patent: Aug. 25, 2015

(54) SPRING UNIT AND SLIDING MECHANISM

(75) Inventors: Tetsuya Katsuta, Chiba (JP); Yasuhiro Mitsui, Chiba (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 0 days.

(21) Appl. No.: 14/131,589

(22) PCT Filed: Jul. 11, 2012

(86) PCT No.: PCT/JP2012/067700
§ 371 (c)(1),
(2), (4) Date: Mar. 6, 2014

(87) PCT Pub. No.: WO2013/008847
PCT Pub. Date: Jan. 17, 2013

(65) Prior Publication Data
US 2014/0301678 A1 Oct. 9, 2014

(30) Foreign Application Priority Data
Jul. 11, 2011 (JP) .................................. 2011-152778

(51) Int. Cl.
*F16C 27/02* (2006.01)
*F16F 3/02* (2006.01)
*F16C 29/00* (2006.01)
*H04M 1/02* (2006.01)

(52) U.S. Cl.
CPC .................. *F16C 29/002* (2013.01); *F16F 3/02* (2013.01); *F16F 3/023* (2013.01); *H04M 1/0237* (2013.01)

(58) Field of Classification Search
CPC ........ F16C 29/002; H04M 1/0237; F16F 1/00; F16F 1/02; F16F 1/025; F16F 1/368; F16F 1/3683; F16F 1/3686; F16F 3/02; F16F 1/023; F16F 1/10; F16F 2238/02
USPC ........ 384/10, 26, 37; 267/158, 159, 164, 165, 267/36.1, 40, 41, 47, 260, 262
See application file for complete search history.

(56) References Cited

U.S. PATENT DOCUMENTS

| 2010/0103597 A1* | 4/2010 | Ahn et al. ................. 361/679.01 |
| 2010/0214726 A1 | 8/2010 | Kubota |
| 2010/0237550 A1 | 9/2010 | Kubota |

FOREIGN PATENT DOCUMENTS

| CN | 201248060 Y * | 5/2009 |
| CN | 102102721 | 6/2011 |
| JP | 2009-133495 | 6/2009 |

(Continued)

OTHER PUBLICATIONS

International Search Report mailed on Sep. 25, 2012.

(Continued)

*Primary Examiner* — Phillip A Johnson
(74) *Attorney, Agent, or Firm* — IPUSA, PLLC

(57) ABSTRACT

The present invention relates to a spring unit whose spring constant can be easily changed. The spring unit includes a plurality of wire springs each including a bent part formed in the middle of wire by bending, extending parts extending from the bent part, and end parts formed at ends of the extending parts. The wire springs are arranged side by side, and a deformed part protruding in a direction of arrangement of the wire springs is formed in one or more of the extending parts.

5 Claims, 7 Drawing Sheets

(56) References Cited

FOREIGN PATENT DOCUMENTS

| | | |
|---|---|---|
| JP | 2009-177769 | 8/2009 |
| JP | 3161848 U | 7/2010 |
| WO | WO 2011/002154 | 1/2011 |

OTHER PUBLICATIONS

Japanese Office Action mailed Jan. 8, 2013.
Japanese Office Action mailed Apr. 16, 2013.
Chinese Office Action dated Dec. 3, 2014.

* cited by examiner

SPRING UNIT AND SLIDING MECHANISM

TECHNICAL FIELD

The present invention relates to a spring unit and a sliding mechanism. More particularly, the present invention relates to a spring unit and a sliding mechanism including wire springs.

BACKGROUND ART

There exists an electronic apparatus such as a cell phone or a game machine that includes a stationary unit including, for example, operation keys, and a movable unit including, for example, a liquid crystal display, and configured to be slidable relative to the stationary unit. Such an electronic apparatus includes a sliding mechanism that allows the movable unit to be slid relative to the stationary unit.

A sliding mechanism used for such an electronic apparatus typically includes a spring unit. The sliding mechanism biases the movable unit toward a closing direction until the movable unit is moved by an operator to a predetermined position relative to the stationary unit, and biases the movable unit toward an opening direction after the movable unit is moved past the predetermined position. This configuration improves the operability of the electronic apparatus.

Springs with various structures can be used for the spring unit. Patent document 1, for example, discloses a spring unit including multiple wire springs. The spring unit disclosed by patent document 1 includes multiple (three) wire springs whose ends are connected via connecting parts to bodies of an electronic apparatus. Using wire springs for a spring unit makes it possible to reduce the thickness of an electronic apparatus.

As described above, a sliding mechanism provided in a cell phone or a game machine allows a movable unit to be slid relative to a stationary unit. Here, a feeling (which is hereafter referred to as "operational feeling") that a user feels when sliding the movable unit greatly affects the usability of the cell phone or the game machine. For this reason, the spring characteristic of wire springs constituting a spring unit is changed for each variation of an apparatus or device to change its operational feeling (or flavor).

RELATED-ART DOCUMENT

Patent Document

[Patent document 1] Japanese Laid-Open Patent Publication No. 2009-133495

DISCLOSURE OF INVENTION

Problems to be Solved by the Invention

In the related art, a spring unit is redesigned from scratch to change its spring characteristic. However, when changing a spring unit to suit a variation of an apparatus or device, it is generally not necessary to change the size and shape of the entire spring unit, and also it is generally not necessary to greatly change the spring characteristic of the spring unit.

With the related art, because a spring unit is redesigned from scratch even in such a case, it is difficult to quickly change a spring unit to suit a variation of an electronic apparatus.

Means for Solving the Problems

A general object of the present invention is to provide a spring unit and a sliding mechanism that are improved to solve the above described problem of the related art.

More specifically, one object of the present invention is to provide a spring unit and a sliding mechanism whose spring constant can be quickly changed.

To achieve this object, the present invention provides a spring unit including a plurality of wire springs each of which is made of wire having an L-shape and includes a bent part formed in the middle of the wire by bending, extending parts extending from the bent part, and end parts formed at ends of the extending parts; and attachment parts provided at the end parts. The wire springs are arranged side by side, and a deformed part protruding in a direction of arrangement of the wire springs is formed in one or more of the extending parts.

Advantageous Effect of the Invention

According to the present invention, deformed parts are formed in wire springs to change their spring constants. With this configuration, a spring unit with a desired spring characteristic can be implemented by preparing wire springs with different deformed parts in advance and selecting suitable wire springs from the prepared wire springs.

Figure 1:
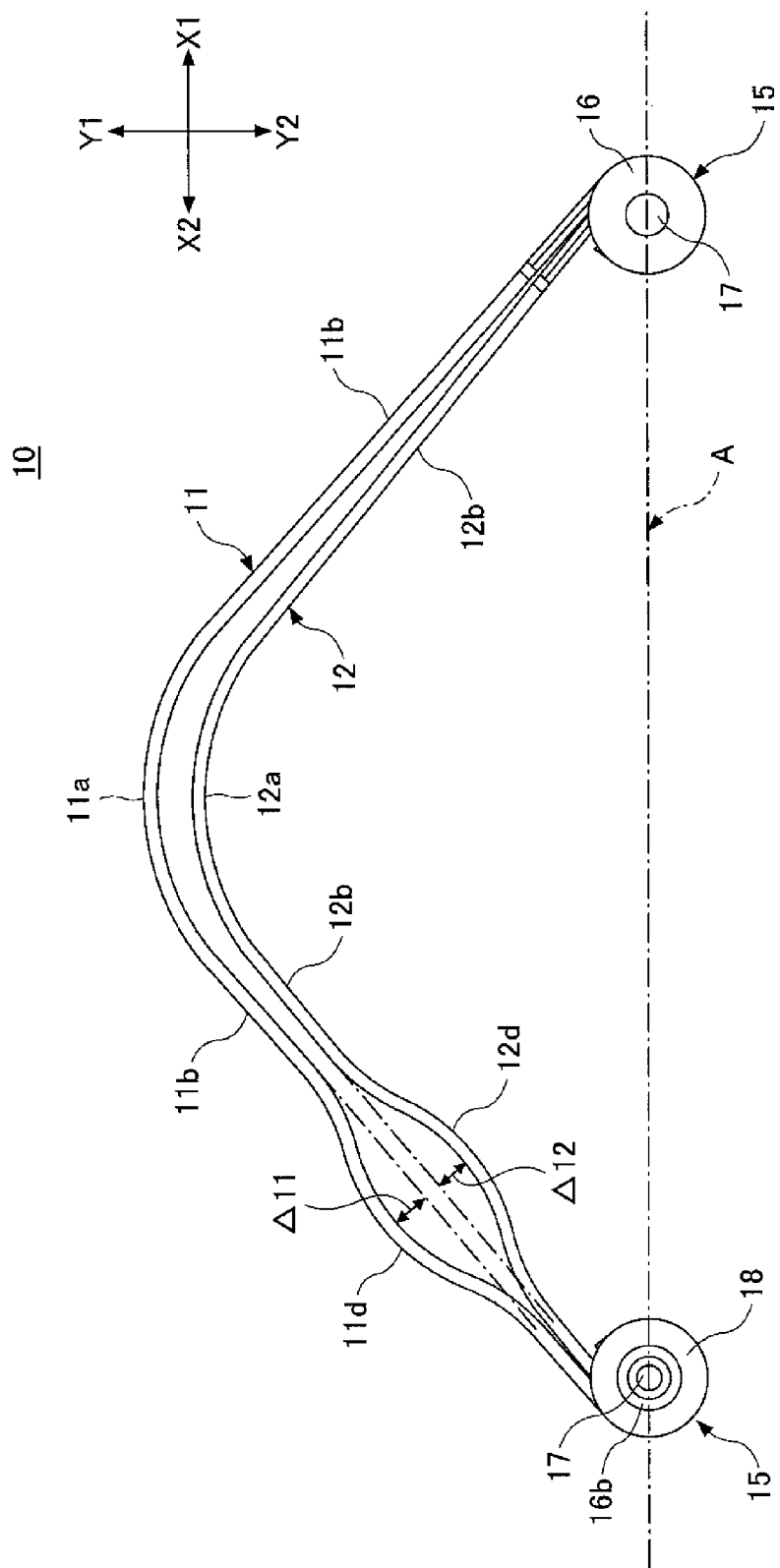
FIG. 1 is a plan view of a spring unit according to an embodiment of the present invention.

EXPLANATION OF REFERENCES 10, 10S, 10M, 10L, 30 Spring unit
11, 12 Wire spring
11$a$, 12$a$ Bent part
11$b$, 12$b$ Extending part
11$c$, 12$c$ End part
11$d$, 12$d$ Deformed part
11$d$S, 12$d$S Small deformed part
11$d$M, 12$d$M Medium deformed part
11$d$L, 12$d$L Large deformed part 15 Attachment part
16 Ring part
17 Pin
18 Washer
20 Sliding mechanism
21 Base plate
22 Sliding plate
25 Side edge part
26 Guide part

DESCRIPTION OF EMBODIMENTS

Embodiments of the present invention are described below with reference to the accompanying drawings.

Figure 2:
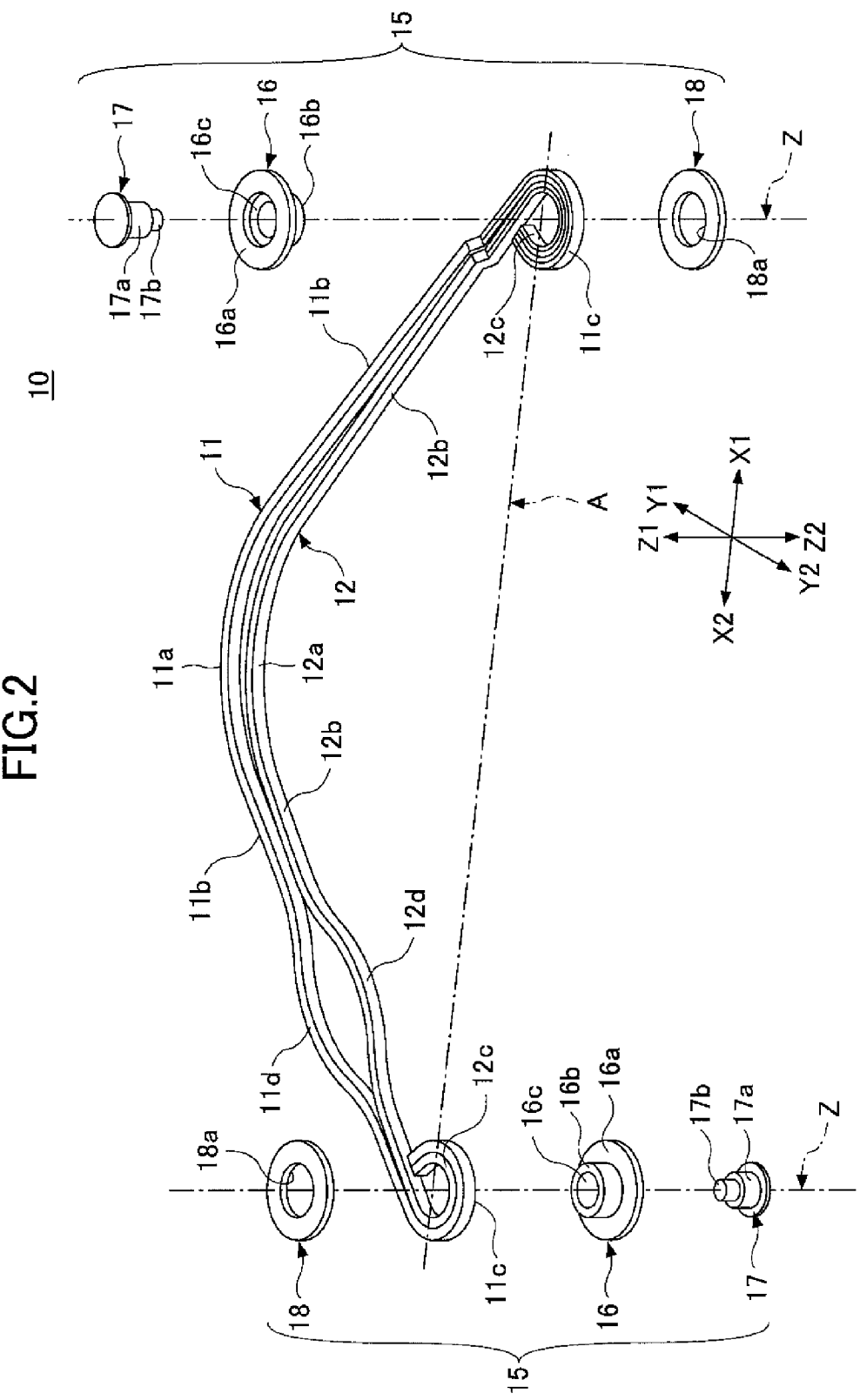
FIG. 2 is an exploded perspective view of a spring unit according to an embodiment of the present invention.

FIGS. 1 and 2 are drawings used to describe a spring unit 10 according to an embodiment of the present invention. FIG. 1 is a plan view of the spring unit 10, and FIG. 2 is an exploded perspective view of the spring unit 10.

The spring unit 10 includes wire springs 11 and 12 and a pair of attachment parts 15. The spring unit 10 of the present embodiment includes two wire springs 11 and 12. However, the number of wire springs is not limited to two and can be determined according to, for example, the configuration of a sliding mechanism for which the wire springs are used. The spring unit 10 is used as an actuator of a sliding mechanism 20 (see FIG. 3) that is used for an electronic apparatus such as a cell phone or a game machine. The wire springs 11 and 12 may be made of a spring material such as a spring steel. In the example of the present embodiment, each of the wire springs 11 and 12 has a rectangular cross section. However, the shape of the cross section of the wire springs 11 and 12 is not limited to a rectangle. The cross section of the wire springs 11 and 12 may have any other shape such as a circular shape, a barrel shape, or an oval shape.

Each of the wire springs 11 and 12 is bent to have a substantially L-shape. More specifically, the wire springs 11 and 12 include, respectively, bent parts 11a and 12a located substantially in the middle of the corresponding wire springs 11 and 12; extending parts 11b and 12b that extend from both ends of the bent parts 11a and 12a; end parts 11c and 12c formed at the ends of the extending parts 11b and 12b, and deformed parts 11d and 12d formed in the extending parts 11b and 12b.

The wire springs 11 and 12 are arranged side by side on the same plane. Here, the "same plane" indicates a plane that is orthogonal to central axes (which are perpendicular to the plane of FIG. 1 and indicated by dashed-dotted lines Z in FIG. 2) of the attachment parts 15 and includes a line segment (a dashed-dotted line A in FIGS. 1 and 2) connecting the centers of the attachment parts 15. In other words, when X-, Y-, and Z-axes are defined, the "same plane" is the X-Y plane that includes the line segment A.

The angle of the bent parts 11a and 12a of the wire springs 11 and 12 may be set at an acute angle, a right angle, or an obtuse angle. Also, the bent parts 11a and 12a of the wire springs 11 and 12 may have different angles. In the present embodiment, the angles of the bent parts 11a and 12a of the wire springs 11 and 12 are substantially the same angle.

The extending parts 11b and 12b extend to the right and left of the bent parts 11c and 12a in FIG. 1. The deformed parts 11d and 12d are formed in one of two pairs of the extending parts 11b and 12b extending to the right and left of the bent parts 11a and 12a. Details of the deformed parts 11d and 12d are described later.

The end parts 11c and 12c are formed at the ends of the extending parts 11b and 12b. As illustrated by FIG. 2, each of the end parts 11c and 12c is bent to form a substantially circular shape. The diameter of the end part 11c is greater than the diameter of the end part 12c. As illustrated by FIG. 2, when the wire springs 11 and 12 are combined, the end part 12c is placed inside of the end part 11c such that the end parts 11c and 12c are in close contact with each other.

Therefore, the thickness (or the height in the Z1-Z2 direction) of the spring unit 10 including the end parts 11c and 12c is the same as the thickness of one spring material. Thus, with the configuration of the spring unit 10 of the present embodiment, it is possible, to reduce the thickness of the end parts 11c and 12c.

The attachment parts 15 are provided at the end parts 11c and 12c. Each of the attachment parts 15 includes a ring part 16, a pin 17, and a washer 18.

The ring part 16 includes a flange 16a and a boss 16b that are formed monolithically by molding a resin. A hole 16c is formed in the center of the ring part 16. The flange 16a has a disc-like shape and has a diameter that is the same as or slightly greater than the diameter of the end part 11c.

The boss 16b is shaped like a cylinder and disposed in the center of the flange 16a. The height of the boss 16b is the same as or slightly greater than the thickness (or the height in the Z1-Z2 direction) of the wire springs 11 and 12. The outside diameter of the boss 16b is the same as or slightly less than the inside diameter of the end part 12c. The hole 16c is formed in the center of the ring part 16 to pass through the flange 16a and the boss 16b in the Z1-2.2 direction. The pin 17 is fit into the hole 16c.

The pin 17 is used to attach the spring unit 10 to the sliding mechanism 20 described later. The pin 17 includes an insertion part 17a and a fixed part 17b that are formed as a monolithic part.

The insertion part 17a is inserted into the hole 16c of the ring part 16. The fixed part 17b is fixed to one of a base plate 21 and a sliding plate 22 that constitute the sliding mechanism 20 when the spring unit 10 is attached to the sliding mechanism 20 (see FIG. 3).

The pin 17 may be made of any appropriate material. For example, the pin 17 may be made of a metal material, a resin, or ceramic.

The washer 18 is a ring-shaped part and is formed by molding a resin. The diameter of a hole 18a formed in the washer 18 is determined such that the boss 16b of the ring part 16 can be fit into the hole 18a. The attachment part 15 is attached to the end parts 11c and 12c by inserting the boss 16b of the ring part 16 into the end parts 11c and 12c and inserting a part of the boss 16b protruding from the end parts 11c and 12c into the washer 18. Then, the pin 17 is inserted into the ring part 16 to form the spring unit 10 including the wire springs 11 and 12 and the attachment parts 15 that are joined together.

Instead of using the attachment parts 15 to attach the wire springs 11 and 12 to the sliding mechanism 20, the wire springs 11 and 12 may be fixed to the sliding mechanism 20 by directly inserting the pin 17 into each pair of the end parts 11c and 12c formed by bending into a circular shape.

However, because the end parts 11c and 12c are formed by bending, the inside diameter of the circular end parts 11c and 12c tends to vary. For this reason, when the ring part 16 is not used, smooth movement of the sliding mechanism 20 may be prevented due to friction or resistance between the pin 17 and the end parts 11c and 12c.

On the other hand, according to the present embodiment, the attachment part 15 is inserted into each pair of the end parts 11c and 12c and fixed to the sliding mechanism 20. The ring part 16 of the attachment part 15 is made of a resin, and the boss 16b is fit into the hole formed by the end parts 11c and 12c. With this configuration, even when the inside diameter of the end parts 11c and 12c varies, the variation is absorbed by deformation of the boss 16b of the ring part 16.

Thus, with the ring part 16 inserted into the end parts 11c and 12c, it is possible to prevent friction or resistance between the pin 17 and the end parts 11c and 12c and thereby enable the sliding mechanism 20 to move smoothly.

Next, the deformed parts 11d and 12d are described.

The deformed parts 11d and 12d are formed in the extending parts 11b and 12b. More specifically, the deformed part 11d is formed in the left one of the extending parts 11b of the wire spring 11 in the figures by deforming a part of the extending part 11b outward (such that it protrudes outward). The deformed part 12d is formed in the left one of the extending parts 12b of the wire spring 12 in the figures by deforming a part of the extending part 12b outward (such that it protrudes outward).

Thus, the deformed parts 11d and 12d are formed by deforming the extending parts 11b and 12b. However, the directions (protruding directions) in which the deformed parts 11d and 12d protrude are the same as the direction in which the wire springs 11 and 12 are arranged. Therefore, even when the bent parts 11a and 12b are provided, the wire springs 11 and 12 are on the "same plane" described above, and the thickness of the wire springs 11 and 12 is unchanged.

Here, the spring characteristic of the wire springs 11 and 12 can be adjusted by changing their lengths. However, the sizes and shapes of the bent parts 11a and 12a, the extending parts 11b and 12b, and the end parts 11c and 12c (which are hereafter referred to as a "basic configuration") constituting the wire springs 11 and 12 are limited by the sliding mechanism 20 for which the spring unit 10 is provided. Therefore, it is difficult to change the lengths of the wire springs 11 and 12 by changing the sizes and shapes of the basic configuration.

On the other hand, compared with the basic configuration, the deformed parts 11d and 12d formed in the extending parts 11b and 12b can be more flexibly changed. According to the present embodiment, a spring unit 10 with a desired spring characteristic can be obtained by changing the shapes of the deformed parts 11d and 12d. Adjustment of the spring characteristic by changing the shapes of the deformed parts 11d and 12d is described later.

Next, the sliding mechanism 20 including the spring unit 10 is described with reference to FIG. 3.

The sliding mechanism 20 roughly includes the base plate 21, the sliding plate 22, and the spring unit 10. FIG. 3 (A) illustrates a state where the sliding plate 22 has been moved in an A2 direction relative to the base plate 21 and is at a closed position. FIG. 3 (B) illustrates a state where the sliding plate 22 is at a middle position in a moving range of the sliding plate 22. FIG. 3 (C) illustrates a state where the sliding plate 22 has been moved in an A1 direction relative to the base plate 21 and is at an open position.

In the descriptions below, it is assumed that the sliding mechanism 20 is used for a cell phone including a movable unit that is slidable relative to a stationary unit. In the example of FIG. 3, the sliding mechanism 20 includes one spring unit 10. However, the sliding mechanism 20 may include multiple spring units 10.

The base plate 21 is fixed to the stationary unit where, for example, various keys of the cell phone are installed. The sliding plate 22 is fixed to the movable unit where, for example, a liquid crystal display is installed.

Guide parts 26 are formed on the corresponding sides of the base plate 21. The guide parts 26 are formed to extend in the A1-A2 direction in FIG. 3. The sliding plate 22 includes side edge parts 25 that are formed at the corresponding sides of the sliding plate and extend in the length direction. The side edge parts 25 slidably engage the guide parts 26. With this configuration, the sliding plate 22 can be slid in the A1-A2 direction relative to the base plate 21.

The pin 17 of one of the attachment parts 15 of the spring unit 10 is rotatably attached to the sliding plate 22, and the pin 17 of another one of the attachment parts 15 is rotatably attached to the base plate 21. Accordingly, the elastic force of the spring unit 10 is applied between the base plate 21 and the sliding plate 22.

Next, operations of the sliding mechanism 20 are described. Below, opening operations of the sliding mechanism 20 during a process of moving the sliding plate 22 from the closed position to the open position are described. Because closing operations of the sliding mechanism 20 during a process of moving the sliding plate 22 from the open position to the closed position are the opposite of the opening operations, their descriptions are omitted here.

Figure 3:
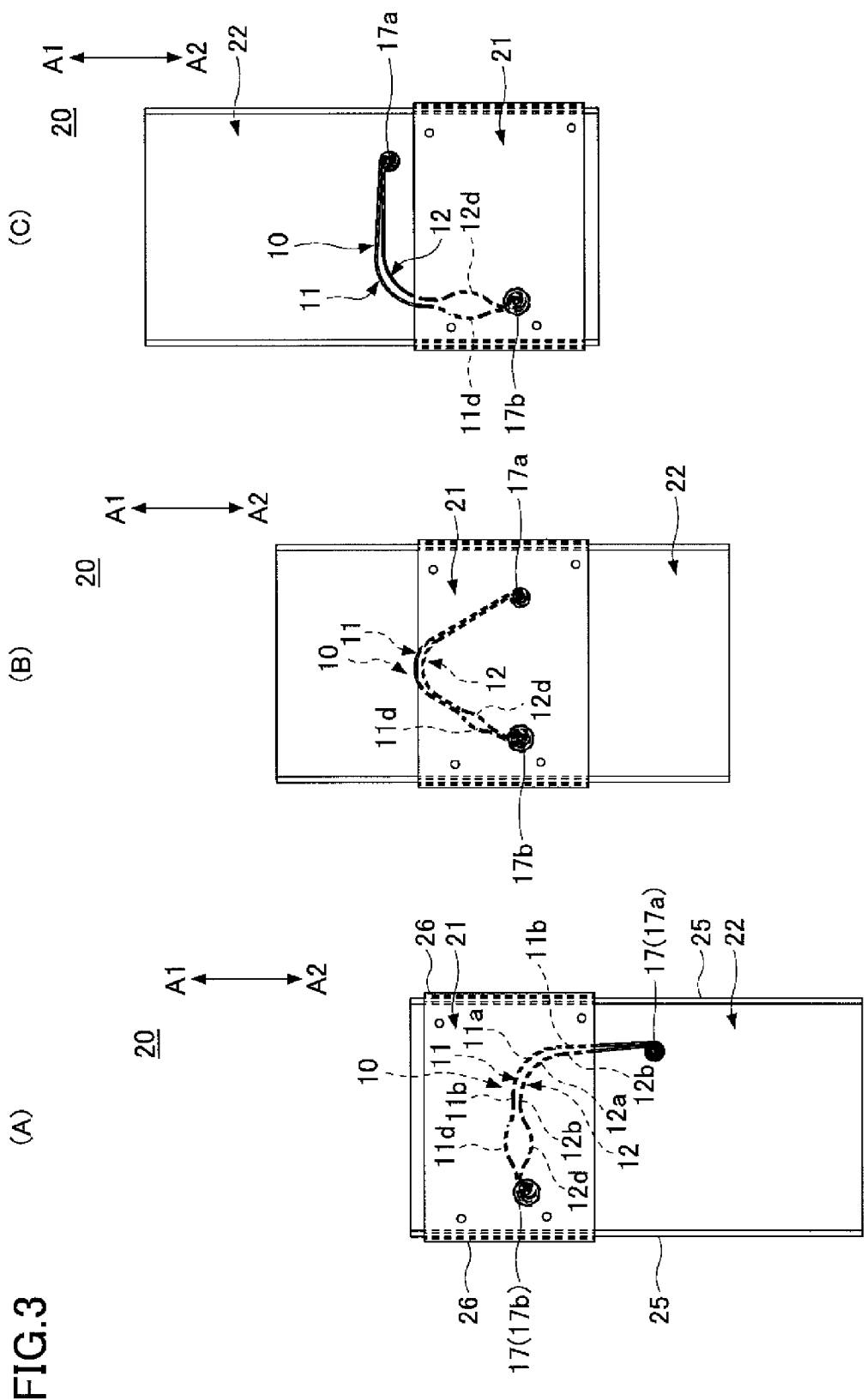
FIG. 3 is a drawing used to describe a configuration and operations of a sliding mechanism according to an embodiment of the present invention: (A) indicates a closed position, (B) indicates a middle position, and (C) indicates an open position.

FIG. 3 (A) illustrates the sliding mechanism 20 where the sliding plate 22 is at the closed position. The sliding plate 22 is at the closed position as a result of being slid in the A2 direction relative to the base plate 21. At the closed position, the elastic force of spring unit 10 biases the sliding plate 22 to move in the A2 direction relative to the base plate 21.

When the sliding plate 22 is moved by an operator in the A1 direction, the pins 17 gradually come closer to each other and accordingly a pair of attachment parts 15 gradually come closer to each other. As a result, the wire springs 11 and 12 having a substantially L-shape are elastically deformed such that the angles of the bent parts 11a and 12a become smaller, and accumulate an elastic force. Also, the deformed parts 11d and 12d formed in the extending parts 11b and 12b are also deformed and accumulate an elastic force.

FIG. 3 (B) illustrates the sliding mechanism 22 where the sliding plate 22 has been slid to the middle position (which is referred to as a "middle state"). In the middle state, the wire springs 11 and 12 of the spring unit 10 are contracted to a maximum degree (i.e., two pairs of the end parts 11c and 12c are close to each other).

While the sliding plate 22 is between the closed position and the middle position, the pin 17 (indicated by 17a in FIG. 3) fixed to the sliding plate 22 is at a position that is shifted in the A2 direction from the pin 17 (indicated by 17b in FIG. 3) fixed to the base plate 21. Therefore, the elastic force generated by the spring unit 10 biases the sliding plate to move in the A2 direction relative to the base plate 21. That is, when an operation to slide the sliding plate 22 in the A1 direction is stopped before the sliding plate 22 reaches the middle position, the sliding plate 22 is caused by the elastic force generated by the spring unit 10 to return to the closed position.

When the sliding plate 22 is slid in the A1 direction past the middle position, the direction in which the elastic force of the spring unit 10 biases the sliding plate 22 is reversed. When the sliding plate 22 is moved from the middle position toward the open position, the position of the pin 17a is shifted in the A1 direction from the position of the pin 17b. In this case, the elastic force of the spring unit 10 biases the sliding plate 22 to move toward the open position relative to the base plate 21.

Accordingly, once the sliding plate 22 exceeds the middle position, even when an operation to slide the sliding plate 22 in the A1 direction is stopped, the sliding plate 22 is caused by the elastic force generated by the spring unit 10 to automatically slide to the open position (indicated by FIG. 3 (C)). Thus, the spring unit 10 functions as a semiautomatic sliding mechanism. Because operations of the sliding mechanism 20 during a process of moving the sliding plate 22 from the open position to the closed position are the opposite of the above described operations, their descriptions are omitted here.

Figure 4:
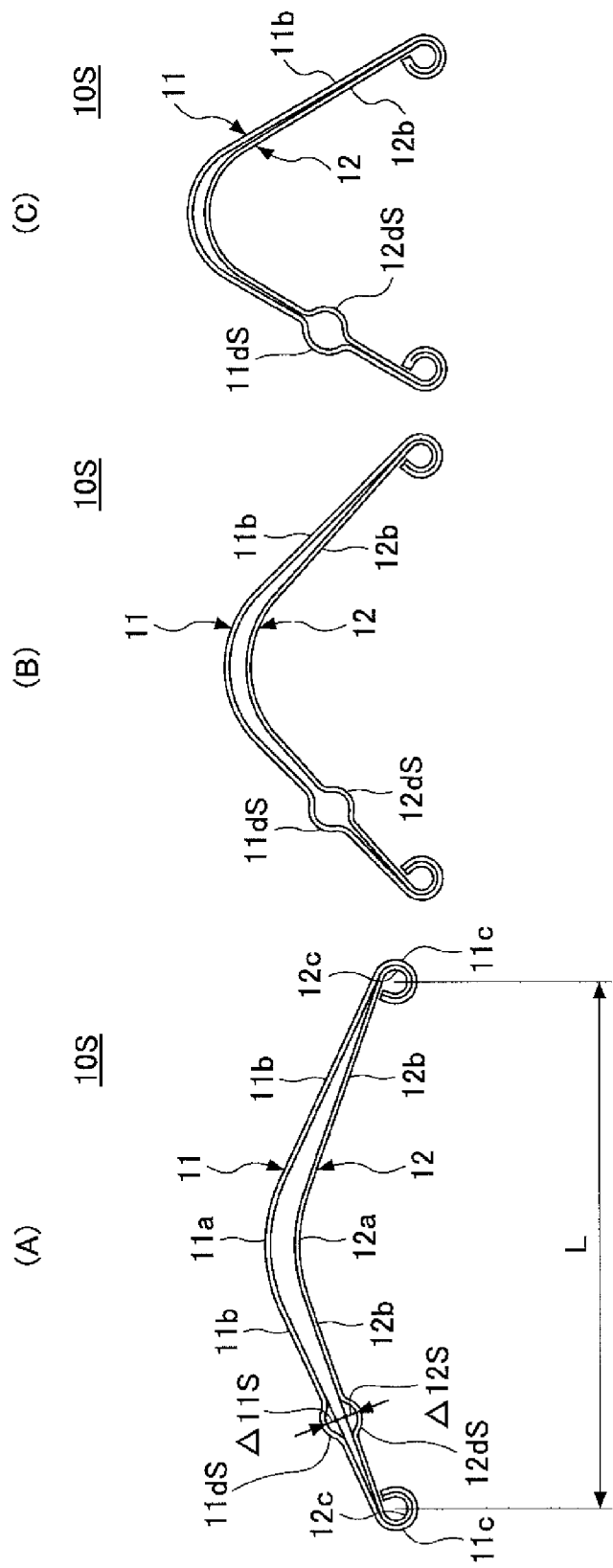
FIG. 4 is a drawing used to describe operations of a spring unit where the amount of displacement of deformed parts is small: (A) indicates a free position, (B) indicates a closed position and an open position, and (C) indicates a middle position.
Figure 5:
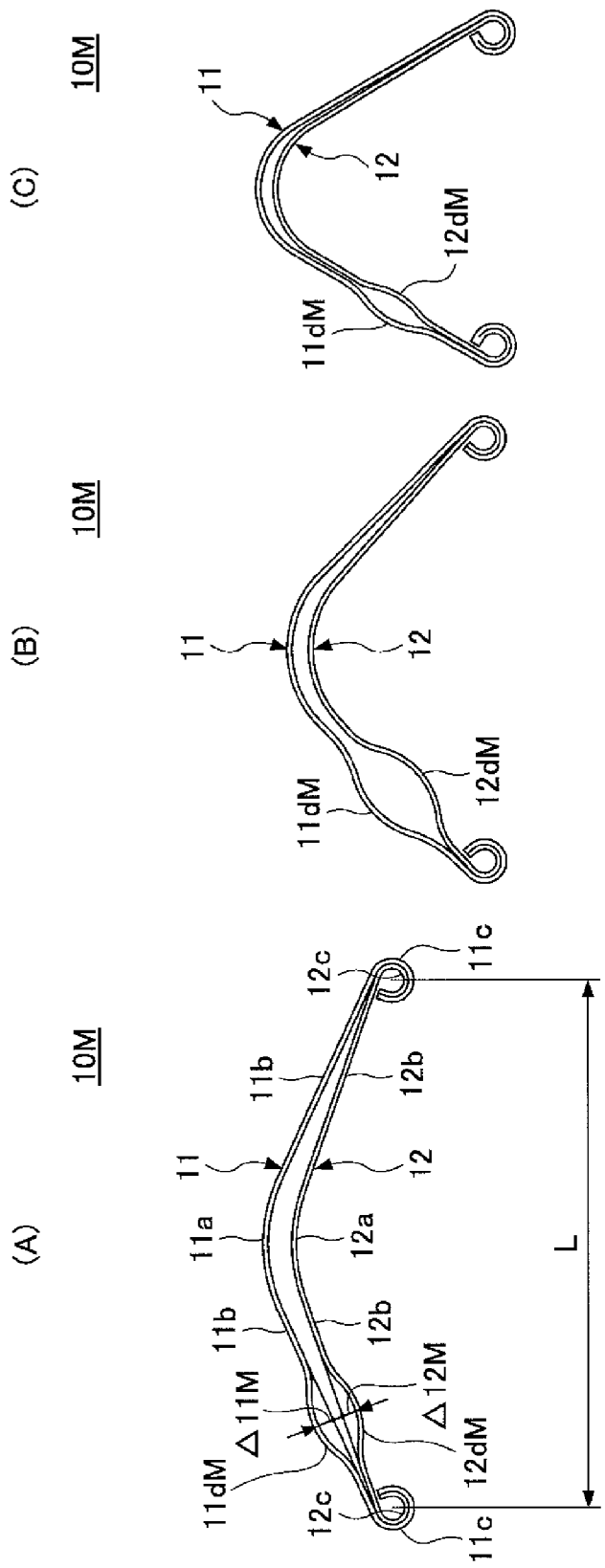
FIG. 5 is a drawing used to describe operations of a spring unit where the amount of displacement of deformed parts is medium: (A) indicates a free position, (B) indicates a closed position and an open position, and (C) indicates a middle position.
Figure 6:
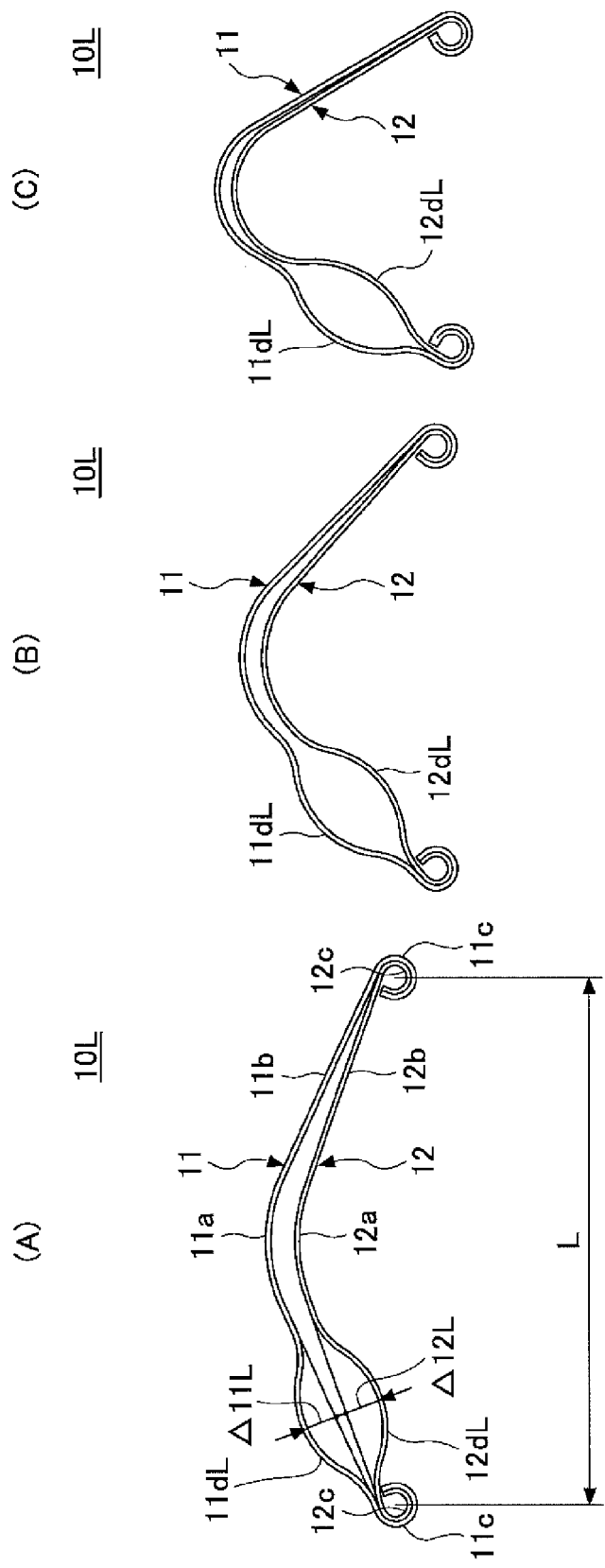
FIG. 6 is a drawing used to describe operations of a spring unit where the amount of displacement of deformed parts is large: (A) indicates a free position, (B) indicates a closed position and an open position, and (C) indicates a middle position.

Next, an exemplary method of changing the spring characteristic of the spring unit 10 by changing the shapes of the deformed parts 11d and 12d is described with reference to FIGS. 4 through 7. In FIGS. 4 through 6, (A) illustrates a state (which is referred to as a "free position") of the spring unit 10 that is not attached to the sliding mechanism 20, (B) illustrates a state of the spring unit 10 that is attached to the sliding mechanism 20 and is at the closed position or the open position, and (C) illustrates a state of the spring unit 10 that is attached to the sliding mechanism 20 and is at the middle position.

FIG. 4 illustrates a spring unit 10S including deformed parts 11d and 12d whose amounts of protrusion are less than those of spring units 10M and 10L illustrated by FIGS. 5 and 6. The amount of protrusion of a deformed part 11 (small deformed part 11dS) of the wire spring 11 of the spring unit 10S is indicated by ∠11S, and the amount of protrusion of a deformed part 12 (small deformed part 12dS) of the wire spring 12 of the spring unit 10S is indicated by ∠12S.

FIG. 5 illustrates the spring unit 10M including deformed parts 11d and 12d whose amounts of protrusion are between those of the spring units 10S and 10L illustrated by FIGS. 4 and 6. The amount of protrusion of a deformed part 11 (medium deformed part 11dM) of the wire spring 11 of the spring unit 10M is indicated by ∠11M, and the amount of protrusion of a deformed part 12 (medium deformed part 12dM) of the wire spring 12 of the spring unit 10M is indicated by ∠12M.

FIG. 6 illustrates the spring unit 101 including deformed parts 11d and 12d whose amounts of protrusion are greater than those of the spring units 10S and 10M illustrated by FIGS. 4 and 5. The amount of protrusion of a deformed part 11 (large deformed part 11dL) of the wire spring 11 of the spring unit 10L is indicated by ∠11L, and the amount of protrusion of a deformed part 12 (large deformed part 12dL) of the wire spring 12 of the spring unit 10L is indicated by ∠12L.

Thus, the relationship among the amounts of protrusion of the deformed parts 11dS, 11dM, and 11dL of the spring units 10S, 10M, and 10L is represented by "∠11S<∠11M<∠11L" and "∠12S<∠12M<∠12L". With the above configurations, the spring unit 10L is the longest, the spring unit 10M is the second longest, and the spring unit 10S is the shortest among the spring units 10S, 10M, and 10L.

Here, in FIGS. 4 through 6, it is assumed that the wire springs 11 and 12 of the spring units 10S, 10M, and 10L are made of the same material and have the same cross sectional shape. Also in FIGS. 4 through 6, it is assumed that in the free position, the spring units 10S, 10M, and 10L have the same distance L (indicated by arrows) between two pairs of the end parts and the same angle of the bent parts 11a and 11b. In FIGS. 4 through 6, the attachment parts 15 are omitted. As illustrated by FIGS. 4 through 6, in the free position, there is a gap between the wire spring 11 and the wire spring 12 of each of the spring units 10S, 10M, and 10L.

When each of the spring units 10S, 10M, and 10L is attached to the sliding mechanism 20 and placed in the closed position or the open position, the gap between the wire springs 11 and 12 decreases. When each of the spring units 10S, 10M, and 10L is placed in the middle position, the bent parts 11a and 12a and the extending parts 11b and 12b, except the deformed parts 11d and 12d, come close to each other or contact each other.

Figure 7:
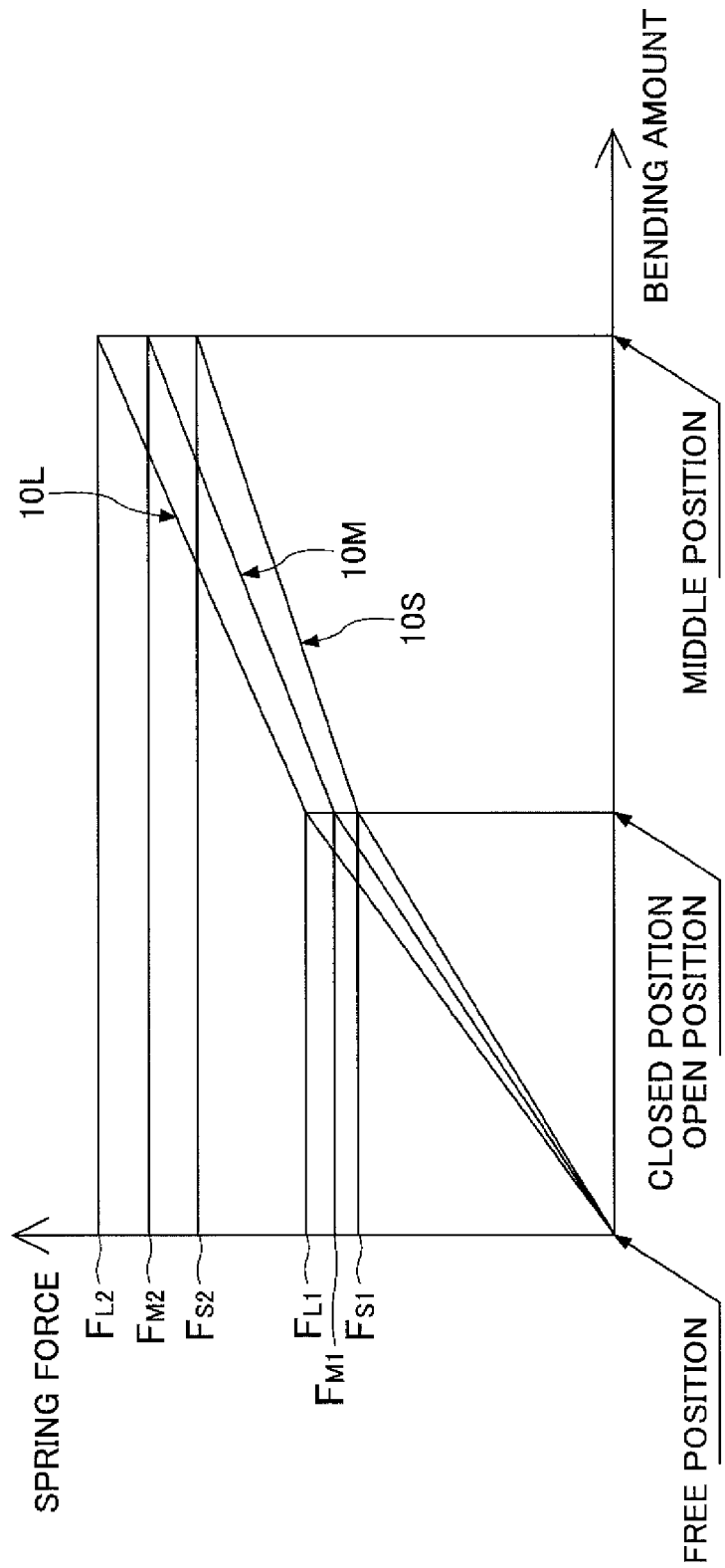
FIG. 7 is a graph illustrating a change in spring force caused by operations of a spring unit.

FIG. 7 is a graph illustrating a spring force of each of the spring units 10S, 10M, and 10L. In FIG. 7, the horizontal axis indicates the bending amount of the spring units 10S, 10M, and 10L, and the vertical axis indicates the spring force. The bending amount is plotted on the horizontal axis at three positions: when the spring units 10S, 10M, and 10L are in the free position, in the open/closed position, and in the middle position.

As illustrated by FIG. 7, when the spring units 10S, 10M, and 10L are not attached to the sliding mechanism 20, i.e., in the free position, the bending amount is zero and the spring force is also zero.

When the spring units 10S, 10M, and 10L are attached to the sliding mechanism 20 as illustrated by FIGS. 3 (A) and (C) (i.e., in the closed position or the open position), the spring units 10S, 10M, and 10L are bent. However, the bending amount in this state is less than the bending amount of each of the spring units 10S, 10M, and 10L in the middle state illustrated by FIG. 3 (B).

As illustrated by FIG. 7, in the closed position or the open position, a spring force $F_{S1}$ generated by the spring unit 10S is the smallest, a spring force $F_{M1}$ generated by the spring unit 10M is greater than the spring force $F_{S1}$, and a spring force $F_{L1}$ generated by the spring unit 10L is greater than the spring force $F_{M1}$ ($F_{S1} < F_{M1} < F_{L1}$).

When the spring units 10S, 10M, and 10L are in the middle position, their spring forces further increase. The order in the spring forces of the spring units 10S, 10M, and 10L in the middle position is the same ($F_{S2} < F_{M2} < F_{L2}$) as that in the closed position or the open position. However, the difference between the spring forces is greater.

Thus, with the deformed parts 11d and 12d formed in the wire springs 11 and 12, the spring units 10S, 10M, and 10L generate different spring forces even when the bending amounts are the same. This is because the lengths (overall lengths) of the wire springs 11 and of the spring units 10S, 10M, and 10L are made different from each other by changing the size and shape of the deformed parts 11d and 12d (11dS, 12dS, 11dM, 12dM, 11dL, and 12dL).

Thus, the spring unit 10 of the present embodiment includes the deformed parts 11d and 12d formed in the wire springs 11 and 12. This configuration makes it easier to produce a spring unit 10 with a desired spring characteristic by adjusting the shape(s) of the deformed parts 11d and 12d. This configuration also makes it possible to change the spring characteristic without changing the distance L between a pair of attachment parts 15.

For example, spring units 10 with different deformed parts may be prepared in advance, and one of the spring units 10 with a spring characteristic desired for the sliding mechanism 20 may be selected. This makes it possible to easily change the spring characteristic of the spring unit 10. This approach is particularly effective when the spring unit 10 is used for a device such as a cell phone whose design is frequently changed.

Here, when the wire spring 11 and the wire spring 12 do not include deformed parts and have a similar shape, it is difficult to distinguish between them. In the related art, this has been one of the causes that reduce the efficiency of assembling spring units. On the other hand, in the spring unit 10 of the present embodiment, the deformed part 11d formed in the wire spring 11 has a shape different from the shape of the deformed part 12d formed in the wire spring 12. This configuration makes it possible to distinguish between the wire spring 11 and the wire spring 12 using the deformed parts 11d and 12d as distinguishing marks. Thus, the configuration of the spring unit 10 of the present embodiment also makes it possible to improve the efficiency of assembly.

Preferred embodiments of the present invention are described above. However, the present invention is not limited to the specifically disclosed embodiments, and variations and modifications may be made without departing from the scope of the present invention.

For example, in the above embodiment, the deformed parts 11d and 12d are formed only in the extending parts 11b and 12b on the left in figures. However, the position where the deformed parts 11d and 12d are formed is not limited to the above described example. For example, the deformed parts 11d and 12d may be formed in the extending parts 11b and 12b on the right in figures, or may be formed in both pairs of the extending parts 11b and 12b on the right and left.

The present international application claims priority from Japanese Patent Application No. 2011-152778 filed on Jul. 11, 2011, the entire contents of which are hereby incorporated herein by reference.

The invention claimed is:

1. A spring unit, comprising:
   a plurality of wire springs each including
      a bent part formed in a middle thereof by bending,
      extending parts extending from the bent part, and
      end parts formed at ends of the extending parts,
   wherein the wire springs are arranged side by side, and a deformed part protruding in a direction of arrangement of the wire springs is formed only in one of a pair of the extending parts on corresponding sides of the bent part.

2. The spring unit as claimed in claim 1, wherein the deformed part is formed in one of the pair of the extending parts of each of the wire springs, and the deformed parts of the wire springs have different shapes.

3. The spring unit as claimed in claim 1, further comprising:
   attachment parts provided at the end parts that are formed in a circular shape,
   wherein each of the attachment parts includes a ring part having a hole formed therein and attached to a corresponding one of the end parts and a pin inserted into the hole.

4. The spring unit as claimed in claim 3, wherein the ring part is made of a resin material.

5. A sliding mechanism, comprising:
   a base plate;
   a sliding plate slidably attached to the base plate; and
   a spring unit disposed between the base plate and the sliding plate and configured to bias the sliding plate in a direction in which the sliding plate slides relative to the base plate,
   wherein the spring unit includes a plurality of wire springs arranged side by side, and each of the wire springs includes
      a bent part formed in a middle thereof by bending,
      extending parts extending from the bent part, and
      end parts formed at ends of the extending parts; and
   wherein a deformed part protruding in a direction of arrangement of the wire springs is formed only in one of a pair of the extending parts on corresponding sides of the bent part.

* * * * *